United States Patent
Ho et al.

(10) Patent No.: US 11,880,510 B2
(45) Date of Patent: Jan. 23, 2024

(54) WIRELESS KEYBOARD AND MOUSE COMBO CAPABLE OF SWITCHING BOTH LINKEDLY BETWEEN CONTROLLED DEVICES

(71) Applicant: Acrox Technologies Co., Ltd., Taipei (TW)

(72) Inventors: Chin-Sung Ho, Taipei (TW); Endrit Hajno, Taipei (TW)

(73) Assignee: ACROX TECHNOLOGIES CO., LTD., Taipei (TW)

( * ) Notice: Subject to any disclaimer, the term of this patent is extended or adjusted under 35 U.S.C. 154(b) by 0 days.

(21) Appl. No.: 17/836,239

(22) Filed: Jun. 9, 2022

(65) Prior Publication Data
US 2023/0133414 A1    May 4, 2023

(30) Foreign Application Priority Data
Nov. 1, 2021    (TW) .................................. 110140640

(51) Int. Cl.
*G06F 3/023*    (2006.01)
*G06F 3/0354*    (2013.01)

(52) U.S. Cl.
CPC ........ *G06F 3/0231* (2013.01); *G06F 3/03543* (2013.01)

(58) Field of Classification Search
None
See application file for complete search history.

(56) References Cited

U.S. PATENT DOCUMENTS

| | | | | |
|---|---|---|---|---|
| 11,531,413 B1* | 12/2022 | Su | ..................... | G06F 3/0383 |
| 2003/0103464 A1* | 6/2003 | Wong | ................. | H04W 28/18 |
| | | | | 370/252 |
| 2003/0197488 A1* | 10/2003 | Hulvey | ............... | G06F 1/3203 |
| | | | | 320/135 |
| 2006/0035590 A1* | 2/2006 | Morris | ................ | H04W 52/28 |
| | | | | 710/1 |
| 2009/0251413 A1* | 10/2009 | Winchester | .......... | G06F 3/0481 |
| | | | | 345/157 |
| 2013/0282932 A1* | 10/2013 | Robert | ............... | H04W 76/14 |
| | | | | 710/17 |
| 2015/0279329 A1* | 10/2015 | Qiu | ...................... | G09G 5/14 |
| | | | | 345/637 |
| 2019/0124442 A1* | 4/2019 | Hanes | .................. | H04R 3/005 |

FOREIGN PATENT DOCUMENTS

| | | | |
|---|---|---|---|
| CN | 201229555 Y | * | 4/2009 |
| CN | 204600435 U | * | 9/2015 |
| CN | 111147965 A | * | 5/2020 |

OTHER PUBLICATIONS

Bluetooth Module User Manual, Sep. 24, 2017, https://fccid.io/2AK6D-VTG2480/User-Manual/User-Manual-1-of-2-3335647, p. 3 (Year: 2017).*

* cited by examiner

*Primary Examiner* — Kirk W Hermann
(74) *Attorney, Agent, or Firm* — Volpe Koenig (57) ABSTRACT

A wireless keyboard and mouse combo includes a wireless keyboard including a first switching switch, and a keyboard Bluetooth/transceiver chip electrically connected to the first switching switch, and a wireless mouse including a second switching switch, and a mouse Bluetooth/transceiver chip electrically connected to the second switching switch and having a direct communication connection with the keyboard Bluetooth/transceiver chip.

20 Claims, 4 Drawing Sheets

WIRELESS KEYBOARD AND MOUSE COMBO CAPABLE OF SWITCHING BOTH LINKEDLY BETWEEN CONTROLLED DEVICES

CROSS-REFERENCE TO RELATED APPLICATIONS

The application claims the benefit of Taiwan Patent Application No. 110140640, filed on Nov. 1, 2021, at the Taiwan Intellectual Property Office, the disclosures of which are incorporated herein in their entirety by reference.

FIELD OF THE INVENTION

The present invention relates to a wireless keyboard and mouse combo having a wireless keyboard and a wireless mouse, in particular to the wireless keyboard and the wireless mouse which can linkedly switch from a host commonly connected now to a host commonly connected next.

BACKGROUND OF THE INVENTION

The wireless keyboards and the wireless mouses currently on the market are not linked when they switch between hosts, and they need to be switched individually. That is to say, after a key of the wireless keyboard is pushed to switch to a different host, a button of the wireless mouse is also required to be pushed to switch to that host. When a function of synchronized switching hosts is required, a software for synchronized switching hosts is required to be downloaded from a computer so that the wireless keyboard and the wireless mouse can have the function of switching hosts linkedly, and this is not convenient for a user. How to improve this situation so that the wireless keyboard and the wireless mouse can conveniently switch hosts linkedly is worthy of further research and improvement.

Keeping the drawbacks of the prior art in mind, and through the use of robust and persistent experiments and research, the applicant has finally conceived of a wireless keyboard and mouse combo.

SUMMARY OF THE INVENTION

It is therefore an objective of the present invention to provide a wireless keyboard and mouse combo using hardware synchronization to switch among different hosts via a wireless keyboard. When the wireless keyboard is switched from a first host currently connected to a second host via pushing a key, the wireless mouse is linkedly switched from the first host to the second host also. The proposed combo can switch among different hosts via the wireless mouse too. When the wireless mouse is switched from a first host currently connected to a second host via pushing a button, the wireless keyboard is linkedly switched from the first host to the second host also. This wireless keyboard and mouse combo has a relatively simple configuration and relatively low manufacturing and operational costs, and it has advantages in the field of wireless keyboard and mouse combo.

In accordance with the first aspect of the present invention, a wireless keyboard and mouse combo comprises a wireless keyboard including a first switching switch, a keyboard transceiver chip, a key matrix, and a keyboard Bluetooth chip electrically connected to the keyboard transceiver chip, the first switching switch and the key matrix, and a wireless mouse including a second switching switch, two mouse buttons, a mouse transceiver chip, and a mouse Bluetooth chip electrically connected to the mouse transceiver chip, the second switching switch and the two mouse buttons, wherein when the first switching switch or the second switching switch is triggered, the wireless keyboard and the wireless mouse are linked and switched from a first host currently connected with the two to a second host.

In accordance with the second aspect of the present invention, a wireless keyboard and mouse combo comprises a wireless keyboard including a first switching switch, and a keyboard Bluetooth/transceiver chip electrically connected to the first switching switch, and a wireless mouse including a second switching switch, and a mouse blue tooth/transceiver chip electrically connected to the second switching switch, wherein when the first switching switch or the second switching switch is triggered, the wireless keyboard and the wireless mouse are both linked and switched from a first host to a second host.

In accordance with the third aspect of the present invention, a wireless keyboard and mouse combo for one of a plurality of controlled devices comprises a wireless keyboard including a first switching switch, and a keyboard Bluetooth/transceiver chip electrically connected to the first switching switch, and a wireless mouse including a second switching switch, and a mouse Bluetooth/transceiver chip electrically connected to the second switching switch and having a direct communication connection with the keyboard Bluetooth/transceiver chip.

BRIEF DESCRIPTION OF THE DRAWINGS

Other objectives, advantages and efficacies of the present invention will be described in detail below taken from the preferred embodiments with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purposes of illustration and description only; it is not intended to be exhaustive or to be limited to the precise form disclosed.

The present invention uses hardware synchronization to cause a wireless keyboard and a wireless mouse of a wireless keyboard and mouse combo to switch hosts linkedly. The wireless keyboard (e.g., a wireless Bluetooth keyboard) can actively switch from the current host to a different host, and cause the wireless mouse (e.g., a wireless Bluetooth mouse) to linkedly switch to the different host also. The wireless mouse can also switch from the current host to a different host, and cause the wireless keyboard to linkedly switch to the different host too.

Figure 1:
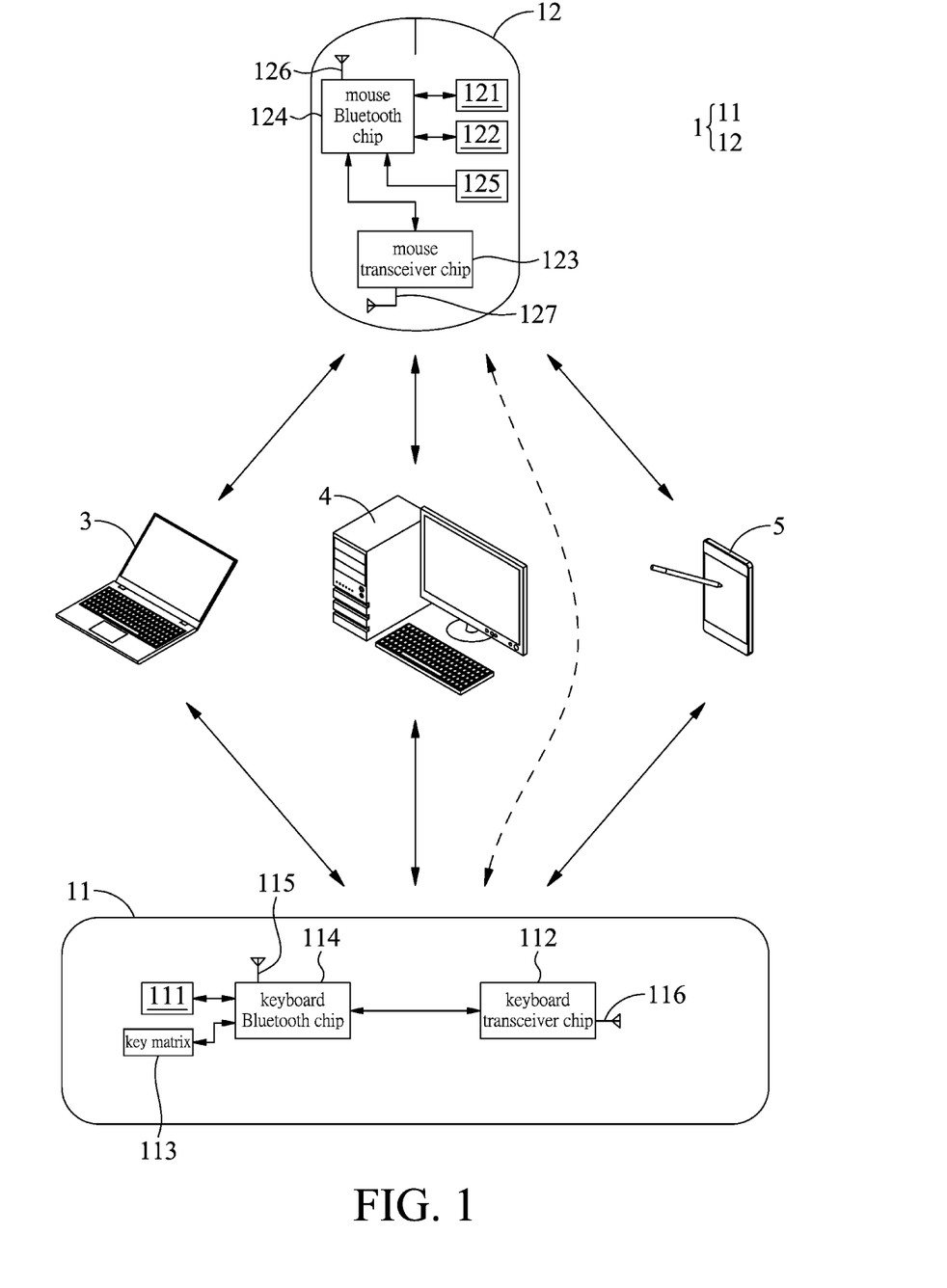
FIG. 1 is a circuit schematic diagram of a wireless keyboard and mouse combo according to the first preferred embodiment of the present invention.

FIG. 1 shows a circuit schematic diagram of a wireless keyboard and mouse combo according to the first preferred embodiment of the present invention. In FIG. 1, the wireless keyboard and mouse combo 1 has a wireless keyboard 11 and a wireless mouse 12. The wireless keyboard 11 has a first switching switch 111, a keyboard transceiver chip 112, a key matrix 113 and a keyboard Bluetooth chip 114 electrically connected to the keyboard transceiver chip 112, the first switching switch 111 and the key matrix 113. In addition, the wireless keyboard 11 further includes a first antenna 115 and a second antenna 116. The wireless mouse 12 has a second switching switch 121, two mouse buttons 122, a mouse transceiver chip 123, a sensor 125 and a mouse Bluetooth chip 124 electrically connected to the mouse transceiver chip 123, the second switching switch 121, the sensor 125 and the two mouse buttons 122. In addition, the wireless mouse 12 further includes a third antenna 126 and a fourth antenna 127, wherein the sensor 125 is an optical mouse motion sensor 125 used to sense a movement of the wireless mouse 12. When the first switching switch 111 or the second switching switch 121 is touched, the wireless keyboard 11 and the wireless mouse 12 are linked and switched from a first host currently connected with the two to a second host. As shown in FIG. 1, there are a first external host 3 (in this embodiment, it is shown as a laptop), a second external host 4 (in this embodiment, it is shown as a desktop computer) and a third external host 5 (in this embodiment, it is shown as a notebook). The first host and the second host are any two being selected from a group consisting of the first external host 3, the second external host 4 and the third external host 5. For example, the first host can be the first external host 3, and the second host can be the second external host 4. Moreover, the first host and the second host can also be a combination of any two of the first to the third external hosts.

Figure 2:
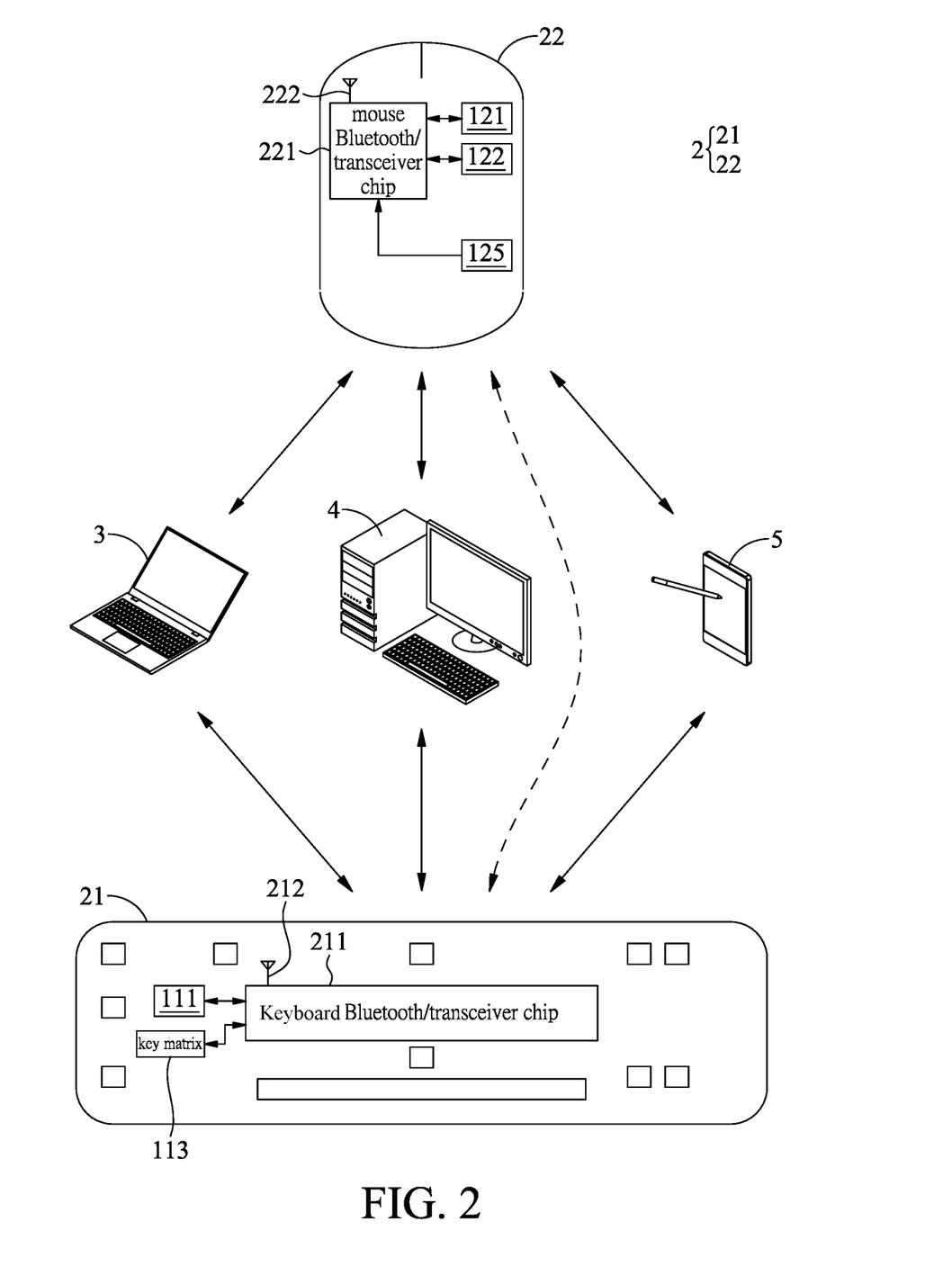
FIG. 2 is a circuit schematic diagram of a wireless keyboard and mouse combo according to the second preferred embodiment of the present invention.

FIG. 2 shows a circuit schematic diagram of a wireless keyboard and mouse combo according to the second preferred embodiment of the present invention. In FIG. 2, the wireless keyboard and mouse combo 2 has a wireless keyboard 21 and a wireless mouse 22. The wireless keyboard 21 has a first switching switch 111, a key matrix 113, and a keyboard Bluetooth/transceiver chip 211 electrically connected to the first switching switch 111 and the key matrix 113. The wireless mouse 22 includes a second switching switch 121, two mouse buttons 122, a sensor 125 and a mouse Bluetooth/transceiver chip 221 electrically connected to the second switching switch 121, the two mouse buttons 122 and the sensor 125.

Figure 3:
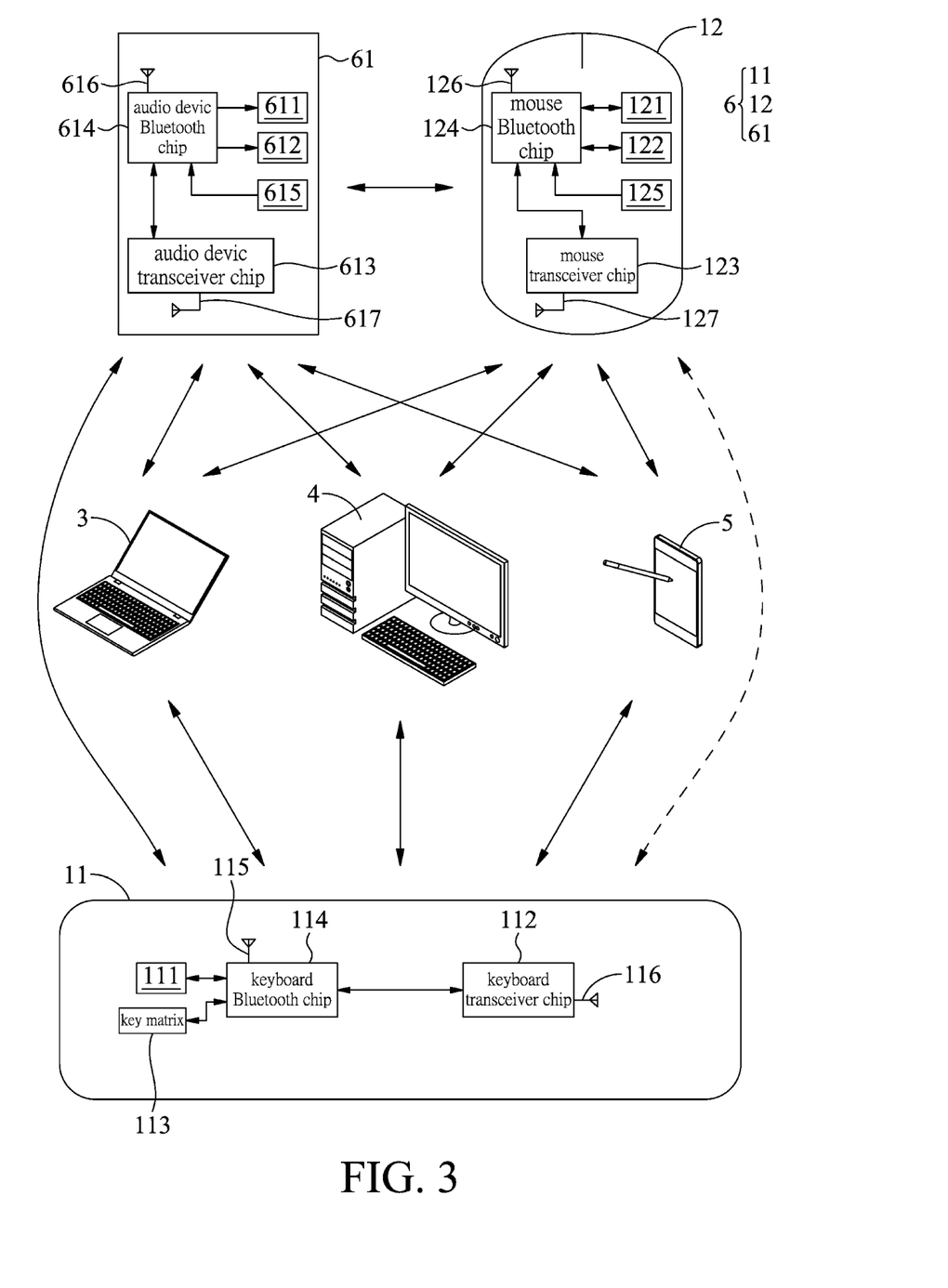
FIG. 3 is a circuit schematic diagram of a wireless keyboard and mouse combo according to the third preferred embodiment of the present invention.

FIG. 3 shows a circuit schematic diagram of a wireless keyboard and mouse combo according to the third preferred embodiment of the present invention. In FIG. 3, the wireless keyboard and mouse combo 6 has a wireless keyboard 11, a wireless mouse 12 and a wireless audio device 61. The wireless keyboard 11 and the wireless mouse 12 are the same as those shown in FIG. 1. The wireless audio device 61 includes a third switching switch 611, a loudspeaker (it can be a speaker or a headphone driver) 612, a microphone 615, an audio device transceiver chip 613, a fifth antenna 616 and a sixth antenna 617 and an audio device Bluetooth chip 614 electrically connected to the third switching switch 611, the loudspeaker 612, the microphone 615, the fifth antenna 616 and the audio device transceiver chip 613. The sixth antenna 617 is electrically connected to the audio device transceiver chip 613.

Figure 4:
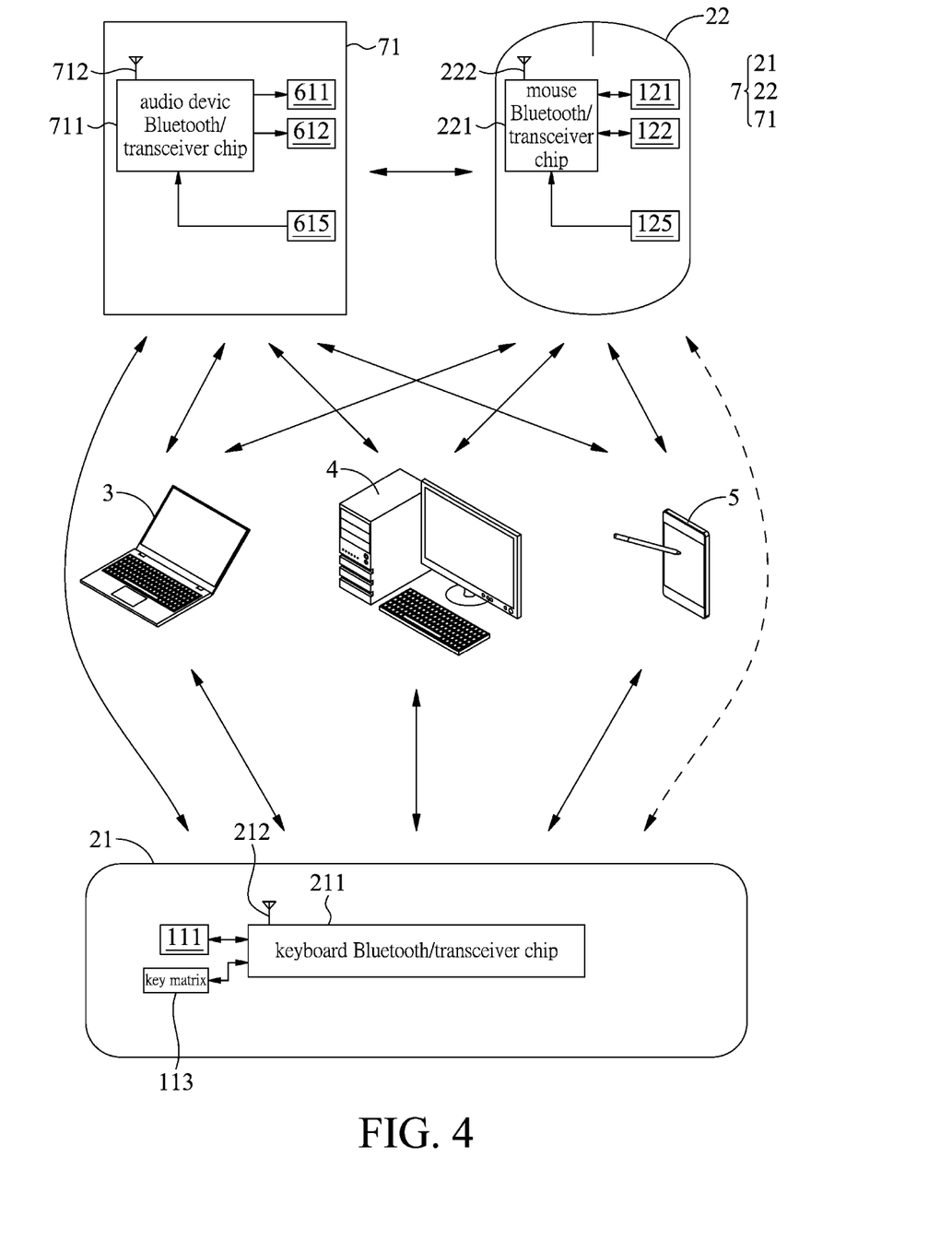
FIG. 4 is a circuit schematic diagram of a wireless keyboard and mouse combo according to the fourth preferred embodiment of the present invention.

FIG. 4 shows a circuit schematic diagram of a wireless keyboard and mouse combo according to the fourth preferred embodiment of the present invention. In FIG. 4, the wireless keyboard and mouse combo 7 has a wireless keyboard 21, a wireless mouse 22 and a wireless audio device 71. The wireless keyboard 21 and the wireless mouse 22 are the same as those shown in FIG. 2. The wireless audio device 71 includes a third switching switch 611, a loudspeaker (it can be a speaker or a headphone driver) 612, a microphone 615, a third antenna 712 and an audio device Bluetooth/transceiver chip 711 electrically connected to the third switching switch 611, the loudspeaker 612, the microphone 615 and the third antenna 712.

In addition, as shown in FIG. 2, the wireless keyboard 21 further includes a first antenna 212 electrically connected to the keyboard Bluetooth/transceiver chip 211, and the wireless mouse 22 further includes a second antenna 222 electrically connected to the mouse Bluetooth/transceiver chip 221. When the first switching switch 111 or the second switching switch 121 is triggered, the wireless keyboard 21 and the wireless mouse 22 are linked and switched from a first host currently connected with the two to a second host. As shown in FIG. 2, there are also a first external host 3 (in this embodiment, it is shown as a laptop too), a second external host 4 (in this embodiment, it is shown as a desktop computer too) and a third external host 5 (in this embodiment, it is shown as a notebook too). The first host and the second host are any two being selected from a group consisting of the first external host 3, the second external host 4 and the third external host 5. For example, the first host can be the first external host 3, and the second host can be the second external host 4. Moreover, the first host and the second host can also be a combination of any two of the first to the third external hosts.

In the wireless keyboard and mouse combo 1 as shown in FIG. 1, when the first switching switch 111 is triggered, an address of a second host ID of the second host (e.g., the second external host 4) is sent from the keyboard transceiver chip 112 to the wireless mouse 12 for a potential linking switch from the first host (e.g., the first external host 3) to the second host (e.g., the second external host 4). The keyboard Bluetooth chip 114 sends the address of the second host ID to the keyboard transceiver chip 112, and the address of the second host ID is sent to the wireless mouse 12 from the keyboard transceiver chip 112. After the wireless mouse 12 received the address of the second host ID, the address of the second host ID is checked first to see whether this is a successfully paired host ID; and if yes, then the wireless mouse 12 uses the address of the second host ID to do a first Bluetooth backlink, and if not, then the wireless mouse 12 keeps a first original connection status.

In FIG. 1, when the second switching switch 121 is triggered, the address of the second host ID is sent from the mouse transceiver chip 123 to the wireless keyboard 11 for a potential linking switch from the first host (e.g., the first external host 3) to the second host (e.g., the second external host 4). The mouse Bluetooth chip 124 sends the address of the second host ID to the mouse transceiver chip 123 and the address of the second host ID is sent to the wireless keyboard 11 from the mouse transceiver chip 123. After the wireless keyboard 11 received the address of the second host ID, the address of the second host ID is checked first to see whether this is a successfully paired host ID; and if yes, then the wireless keyboard 11 uses the address of the second host ID to do a second Bluetooth backlink, and if not, then the wireless keyboard 11 keeps a second original connection status.

In the wireless keyboard and mouse combo 1 as shown in FIG. 1, the keyboard Bluetooth chip 114 controls the key matrix 113, and controls a communication between the keyboard transceiver chip 112 and the wireless mouse 12. The keyboard transceiver chip 112 transmits a first switching command including the address of the second host ID for switching from the first host (e.g., the first external host 3) to the second host (e.g., the second external host 4) to the wireless mouse 12. The mouse Bluetooth chip 124 controls the two mouse buttons 122, and controls a communication between the mouse transceiver chip 123 and the wireless keyboard 11. The mouse transceiver chip 123 is used to transmit a second switching command including the address of the second host ID for switching from the first host (e.g., the first external host 3) to the second host (e.g., the second external host 4) to the wireless keyboard 11. The keyboard transceiver chip 112 is also used to receive the second switching command, and the mouse transceiver chip 123 is used to receive the first switching command too. The first host (e.g., the first external host 3) and the second host (e.g., the second external host 4) are any two being selected from a group consisting of the first external host 3, the second external host 4 and the third external host 5. The wireless keyboard 11 includes a plurality of keys, and the key matrix 113 includes an 8×18 matrix used to indicate a key of the plurality of keys currently being pressed.

In FIG. 1, the first antenna 115 included in the wireless keyboard 11 is electrically connected to the keyboard Bluetooth chip 114, the second antenna 116 is electrically connected to the keyboard transceiver chip 112, the third antenna 126 is electrically connected to the mouse Bluetooth chip 124, and the fourth antenna 127 is electrically connected to the mouse transceiver chip 123. Any one of the first external host 3, the second external host 4 and the third external host 5 is one selected from a group consisting of a laptop (3, as shown in FIG. 1), a desktop computer (4, as shown in FIG. 1) and a notebook (5, as shown in FIG. 1), and the keyboard transceiver chip 112 and the mouse transceiver chip 123 are respectively a radio frequency transceiver chip.

As shown in FIG. 2, the first antenna 212 and a key matrix 113 included in the wireless keyboard 21 are electrically connected to the keyboard Bluetooth/transceiver chip 211, and the second antenna 222 and the two mouse buttons 122 included in the wireless mouse 22 are electrically connected to the mouse Bluetooth/transceiver chip 221. The wireless keyboard 21 includes a plurality of keys, and the key matrix 113 includes an 8×18 matrix and is used to indicate a key of the plurality of keys currently being pressed. The keyboard Bluetooth/transceiver chip 211 includes a keyboard Bluetooth chip (e.g., see the keyboard Bluetooth chip 114 as shown in FIG. 1) and a keyboard transceiver chip (e.g., see the keyboard transceiver chip 112 as shown in FIG. 1) electrically connected to the keyboard Bluetooth chip, the mouse Bluetooth/transceiver chip 221 includes a mouse Bluetooth chip (e.g., see the mouse Bluetooth chip 124 as shown in FIG. 1) and a mouse transceiver chip (e.g., see the mouse transceiver chip 123 as shown in FIG. 1) electrically connected to the mouse Bluetooth chip.

In FIG. 2, when the first switching switch is triggered, the keyboard Bluetooth chip (e.g., see the keyboard Bluetooth chip 114 as shown in FIG. 1) sends an address of a second host ID (e.g., see the second external host 4) of the second host to the keyboard transceiver chip (e.g., see the keyboard transceiver chip 112 as shown in FIG. 1); the address of the second host ID is sent to the wireless mouse 22 from the keyboard transceiver chip (e.g., see the keyboard transceiver chip 112 as shown in FIG. 1); after the wireless mouse 22 received the address of the second host ID, the address of the second host ID is checked first to see whether this is a successfully paired host ID; and if yes, then the wireless mouse 22 uses the address of the second host ID to do a Bluetooth backlink, and if not, then the wireless mouse 22 keeps a first original connection status. When the second switching switch 121 is triggered, the mouse Bluetooth chip (e.g., see the mouse Bluetooth chip 124 as shown in FIG. 1) sends the address of the second host ID of the second host (e.g., see the second external host 4) to the mouse transceiver chip (e.g., see the mouse transceiver chip 123 as shown in FIG. 1); the address of the second host ID is sent to the wireless keyboard 21 from the mouse transceiver chip (e.g., see the mouse transceiver chip 123 as shown in FIG. 1); after the wireless keyboard 21 received the address of the second host ID, the address of the second host ID is checked first to see whether this is a successfully paired host ID; and if yes, then the wireless keyboard 21 uses the address of the second host ID to do the Bluetooth backlink, and if not, then the wireless keyboard 21 keeps a second original connection status.

As shown in FIG. 3, the wireless keyboard and mouse combo 6 further comprising a wireless audio device 61, wherein the wireless audio device 61 includes a third switching switch 611, a loudspeaker 612, a microphone 615, an audio device transceiver chip 613 and an audio device Bluetooth chip 614, the audio device Bluetooth chip 614 is electrically connected to the audio device transceiver chip 613, the third switching switch 611, the loudspeaker 612 and the microphone 615, the wireless mouse 12 further includes a sensor 125 for sensing a movement of the wireless mouse 12, the keyboard Bluetooth chip 114 controls the key matrix 113, and controls a communication between the keyboard transceiver chip 112 and the wireless mouse 12, or a communication between the keyboard transceiver chip 112 and the wireless audio device 61, and the keyboard transceiver chip 112 transmits a first switching command including the address of the second host ID for switching from the first host to the second host to the wireless mouse 12 and the wireless audio device 61. The mouse Bluetooth chip 124 controls the two mouse buttons 122, and controls a communication between the mouse transceiver chip 123 and the wireless keyboard 11, or a communication between the mouse transceiver chip 123 and the wireless audio device 61, and the mouse transceiver chip 123 is used to transmit a second switching command including the address of the second host ID for switching from the first host to the second host to the wireless keyboard 11 and the wireless audio device 61. The audio device Bluetooth chip 614 controls a function of Bluetooth sound effect inside the wireless audio device 61, and controls a communication between the audio device transceiver chip 613 and the wireless mouse 12, or a communication between the audio device transceiver chip 613 and the wireless keyboard 11, and the audio device transceiver chip 613 transmits a third switching command including the address of the second host ID for switching from the first host to the second host to the wireless keyboard 11 and the wireless mouse 12. The keyboard transceiver chip 112 receives the second and the third switching commands, the mouse transceiver chip 123 receives the first and the third switching commands, and the audio device transceiver chip 613 receives the first and the second switching commands. When the first switching switch 111, the second switching switch 112, or the third switching switch 611 is triggered, the wireless keyboard 11, the wireless mouse 12 and the wireless audio device 61 are all linked and switched from a first host then-connected with the three switching switches to a second host. The first host and the second host are any two being selected from a group consisting of a first external host 3, a second external host 4 and a third external host 5, the wireless keyboard 11 includes a plurality of keys, and the key matrix 113 includes an 8×18 matrix used to indicate a key of the plurality of keys currently being pressed.

As shown in FIG. 3, the sensor 125 included in the wireless keyboard and mouse combo 6 is an optical mouse motion sensor, the loudspeaker 612 is a speaker or a headphone driver, after the wireless audio device 61 received the address of the second host ID, the address of the second host ID is checked first to see whether this is a successfully paired host ID; and if yes, then the wireless audio device 61 uses the address of the second host ID to do a third Bluetooth backlink, and if not, then the wireless audio device 61 keeps a third original connection status. The wireless keyboard 11 further includes a first antenna 115 and a second antenna 116, the wireless mouse 12 further includes a third antenna 126 and a fourth antenna 127, the wireless audio device 61 further includes a fifth antenna 616 and a sixth antenna 617, the first antenna 115 is electrically connected to the keyboard Bluetooth chip 114, the second antenna 116 is electrically connected to the keyboard transceiver chip 112, the third antenna 126 is electrically connected to the mouse Bluetooth chip 124, the fourth antenna 127 is electrically connected to the mouse transceiver chip 123, the fifth antenna 616 is electrically connected to the audio device Bluetooth chip 614, and the sixth antenna 617 is electrically connected to the audio transceiver chip 613. The first external host 3, the second external host 4 and the third external host 5 is one selected from a group consisting of a laptop, a desktop computer and a notebook, and each of the audio device transceiver chip 613, the keyboard transceiver chip 112 and the mouse transceiver chip 123 is a radio frequency transceiver chip.

As shown in FIG. 4, the wireless keyboard and mouse combo 7 further comprises a wireless audio device 71, wherein the wireless keyboard 21 further includes a first antenna 212 and a key matrix 113, the wireless mouse 22 further includes a second antenna 222, a sensor 125 and two mouse buttons 122 (see FIG. 2), the wireless audio device 71 includes a third switching switch 611, a loudspeaker 612, a microphone 615, an audio device Bluetooth/transceiver chip 711 and a third antenna 712. The first antenna 212 and the key matrix 113 are electrically connected to the keyboard Bluetooth/transceiver chip 211, the second antenna 222, the sensor 125 and the two mouse buttons 122 are electrically connected to the mouse Bluetooth/transceiver chip 221, and the third switching switch 611, the loudspeaker 612, the microphone 615 and the third antenna 712 are electrically connected to the audio device Bluetooth/transceiver chip 711. The wireless keyboard 21 includes a plurality of keys, the key matrix 113 includes an 8×18 matrix and is used to indicate a key of the plurality of keys currently being pressed, the sensor 125 is used to sense a movement of the wireless mouse 22, the keyboard Bluetooth/transceiver chip 211 includes a keyboard Bluetooth chip (e.g., see the keyboard Bluetooth chip 114 as shown in FIG. 1) and a keyboard transceiver chip (e.g., see the keyboard transceiver chip 112 as shown in FIG. 1) electrically connected to the keyboard Bluetooth chip, the mouse Bluetooth/transceiver chip 221 includes a mouse Bluetooth chip (e.g., see the mouse Bluetooth chip 124 as shown in FIG. 1) and a mouse transceiver chip (e.g., see the mouse transceiver chip 123 as shown in FIG. 1) electrically connected to the mouse Bluetooth chip, and the audio device Bluetooth/transceiver chip 711 includes an audio device Bluetooth chip (e.g., see the audio device transceiver chip 613 as shown in FIG. 3) and an audio device transceiver chip (e.g., see the audio device Bluetooth chip 614 as shown in FIG. 3) electrically connected to the audio device Bluetooth chip.

In FIG. 4, the sensor 125 included in the wireless keyboard and mouse combo 7 is an optical mouse motion sensor, the loudspeaker 612 is a speaker or a headphone driver, when the first switching switch 111 is triggered, the keyboard Bluetooth chip sends an address of a second host ID of the second host to the keyboard transceiver chip; the address of the second host ID is sent to the wireless mouse 22 and the wireless audio device 71 from the keyboard transceiver chip; after the wireless mouse 22 or the wireless audio device 71 received the address of the second host ID, the address of the second host ID is checked first to see whether this is a successfully paired host ID; and if yes, then the wireless mouse 22 or the wireless audio device 71 uses the address of the second host ID to do a Bluetooth backlink, and if not, then the wireless mouse 22 keeps a first original connection status and/or the wireless audio device 71 keeps a third original connection status. When the second switching switch 121 is triggered, the mouse Bluetooth chip sends the address of the second host ID of the second host to the mouse transceiver chip; the address of the second host ID is sent to the wireless keyboard 21 and the wireless audio device 71 from the mouse transceiver chip; after the wireless keyboard 21 or the wireless audio device 71 received the address of the second host ID, the address of the second host ID is checked first to see whether this is a successfully paired host ID; and if yes, then the wireless keyboard 21 or the wireless audio device 71 uses the address of the second host ID to do the Bluetooth backlink, and if not, then the wireless keyboard 21 keeps a second original connection status and/or the wireless audio device 71 keeps the third original connection status. When the third switching switch 611 is triggered, the audio device Bluetooth chip sends the address of the second host ID of the second host to the audio device transceiver chip; the address of the second host ID is sent to the wireless keyboard 21 and the wireless mouse 22 from the audio device transceiver chip; after the wireless keyboard 21 or the wireless mouse 22 received the address of the second host ID, the address of the second host ID is checked first to see whether this is a successfully paired host ID; and if yes, then the wireless keyboard 21 or the wireless mouse 22 uses the address of the second host ID to do the Bluetooth backlink, and if not, then the wireless mouse 22 keeps the first original connection status and/or the wireless keyboard 21 keeps the second original connection status.

A wireless keyboard and mouse combo 2 (see FIG. 2) provided according to another preferred embodiment of the present invention is synchronously used for one of a plurality of controlled devices (as shown in FIGS. 1 and 2, any one of the first external host 3, the second external host 4 and the third external host 5 is one of the controlled devices), it comprises a wireless keyboard 21 including a first switching switch 111, and a keyboard Bluetooth/transceiver chip 211 electrically connected to the first switching switch 111, and a wireless mouse 22 including a second switching switch 121, and a mouse Bluetooth/transceiver chip 221 electrically connected to the second switching switch 121 and having a direct communication connection with the keyboard Bluetooth/transceiver chip 211.

In the above-mentioned wireless keyboard and mouse combo 2 provided according to another preferred embodiment of the present invention, the wireless keyboard 21 further includes a first antenna 212 and a key matrix 113, the wireless mouse 22 further includes a second antenna 222, a sensor 125 and two mouse buttons 122 (see FIG. 2). The first antenna 212 and the key matrix 113 are electrically connected to the keyboard Bluetooth/transceiver chip 211, and the second antenna 222, the sensor 125 and the two mouse buttons 122 are electrically connected to the mouse Bluetooth/transceiver chip 221. The wireless keyboard 21 includes a plurality of keys, the key matrix 113 includes an 8×18 matrix and is used to indicate a key of the plurality of keys currently being pressed. The keyboard Bluetooth/transceiver chip 211 includes a keyboard Bluetooth chip (e.g., see the keyboard Bluetooth chip 114 as shown in FIG. 1) and a keyboard transceiver chip (e.g., see the keyboard transceiver chip 112 as shown in FIG. 1) electrically connected to the keyboard Bluetooth chip, and the mouse Bluetooth/transceiver chip 221 includes a mouse Bluetooth chip (e.g., see the mouse Bluetooth chip 124 as shown in FIG. 1) and a mouse transceiver chip (e.g., see the mouse transceiver chip 123 as shown in FIG. 1) electrically connected to the mouse Bluetooth chip.

As shown in FIG. 2, in the wireless keyboard and mouse combo 2 provided according to another preferred embodiment of the present invention, when the first switching switch 111 or the second switching switch 121 is triggered, one of the keyboard Bluetooth/transceiver chip 211 and the mouse Bluetooth/transceiver chip 221 sends a message to the other one such that the two can be used for synchronously optionally controlling the one of the plurality of controlled devices, wherein the one controlled device is a host (as shown in FIGS. 1 and 2, any one of the first external host 3, the second external host 4 and the third external host 5).

A wireless keyboard and mouse combo 7 (see FIG. 4) provided according to another preferred embodiment of the present invention further comprises a wireless audio device 71, wherein the wireless audio device 71 includes a third switching switch 611 and an audio device Bluetooth/transceiver chip 711 electrically connected to the third switching switch 611 and having direct communication connections with the keyboard Bluetooth/transceiver chip 211 and the mouse Bluetooth/transceiver chip 221, and when the first switching switch 111, the second switching switch 121, or the third switching switch 611 is triggered, one of the audio device Bluetooth/transceiver chip 711, the keyboard Bluetooth/transceiver chip 211 and the mouse Bluetooth/transceiver chip 221 sends a message to the other two such that the three can be used for synchronously optionally controlling the one of the plurality of controlled devices, wherein the one controlled device is a host.

According to the above-mentioned descriptions, the present invention discloses a wireless keyboard and mouse combo using hardware synchronization to switch among different hosts via a wireless keyboard. When the wireless keyboard is switched from a first host currently connected to a second host via pushing a key, the wireless mouse is linkedly switched from the first host to the second host also. The proposed combo can switch among different hosts via the wireless mouse too. When the wireless mouse is switched from a first host currently connected to a second host via pushing a button, the wireless keyboard is linkedly switched from the first host to the second host also. This wireless keyboard and mouse combo has relatively simple configuration and relatively low manufacturing and operational costs, and it has advantages in the field of wireless keyboard and mouse combo, which demonstrates the non-obviousness and novelty.

While the invention has been described in terms of what is presently considered to be the most practical and preferred embodiments, it is to be understood that the invention need not be limited to the disclosed embodiments. Therefore, it is intended to cover various modifications and similar configurations included within the spirit and scope of the appended claims, which are to be accorded with the broadest interpretation so as to encompass all such modifications and similar structures.

What is claimed is:

1. A wireless keyboard and mouse combo capable of switching both linkedly between a plurality of controlled devices, comprising:
    a wireless keyboard including:
        a first switching switch; and
        a keyboard Bluetooth/transceiver chip electrically connected to the first switching switch; and
    a wireless mouse including:
        a second switching switch; and
        a mouse Bluetooth/transceiver chip electrically connected to the second switching switch and having a direct communication connection with the keyboard Bluetooth/transceiver chip through a first switching command corresponding to the first switching switch and/or a second switching command corresponding to the second switching switch.

2. The wireless keyboard and mouse combo according to claim 1, further comprising a wireless audio device, wherein the wireless audio device includes a third switching switch and an audio device Bluetooth/transceiver chip electrically connected to the third switching switch and having direct communication connections with the keyboard Bluetooth/transceiver chip and the mouse Bluetooth/transceiver chip through the first switching command, the second switching command, and a third switching command respectively corresponding to the first switching switch, the second switching switch, and the third switching switch, and when the first switching switch, the second switching switch, or the third switching switch is triggered, one of the wireless keyboard, the wireless mouse and the wireless audio device sends a message to the other two for synchronously optionally controlling one of the plurality of controlled devices, wherein the one controlled device is a host.

3. A wireless keyboard and mouse combo capable of switching both linkedly between controlled devices, comprising:
    a wireless keyboard including:
        a first switching switch;
        a keyboard transceiver chip;
        a key matrix; and
        a keyboard Bluetooth chip electrically connected to the keyboard transceiver chip, the first switching switch and the key matrix; and a wireless mouse including:
        a second switching switch;
        two mouse buttons;
        a mouse transceiver chip; and
        a mouse Bluetooth chip electrically connected to the mouse transceiver chip, the second switching switch and the two mouse buttons, wherein when the first switching switch or the second switching switch is triggered, an address of a second host ID of a second host is sent from the keyboard transceiver chip to the wireless mouse or from the mouse transceiver chip to the wireless keyboard, and the wireless keyboard and the wireless mouse are switched from a first host currently connected with the wireless keyboard and the wireless mouse to the second host.

4. The wireless keyboard and mouse combo according to claim 3, wherein when the first switching switch is triggered, the keyboard Bluetooth chip sends the address of the second host ID to the keyboard transceiver chip; the address of the second host ID is sent to the wireless mouse from the keyboard transceiver chip; after the wireless mouse received the address of the second host ID, the address of the second host ID is checked first to see whether this is a successfully paired host ID; and if yes, then the wireless mouse uses the address of the second host ID to do a first Bluetooth backlink, and if not, then the wireless mouse keeps a first original connection status.

5. The wireless keyboard and mouse combo according to claim 4, wherein when the second switching switch is triggered, the mouse Bluetooth chip sends the address of the second host ID to the mouse transceiver chip; the address of the second host ID is sent to the wireless keyboard from the mouse transceiver chip; after the wireless keyboard received the address of the second host ID, the address of the second host ID is checked first to see whether this is a successfully paired host ID; and if yes, then the wireless keyboard uses the address of the second host ID to do a second Bluetooth backlink, and if not, then the wireless keyboard keeps a second original connection status.

6. The wireless keyboard and mouse combo according to claim 5, further comprising a wireless audio device, wherein the wireless audio device includes a third switching switch, a loudspeaker, a microphone, an audio device transceiver chip and an audio device Bluetooth chip, the audio device Bluetooth chip is electrically connected to the audio device transceiver chip, the third switching switch, the loudspeaker and the microphone, the wireless mouse further includes a sensor electrically connected to the mouse Bluetooth chip for sensing a movement of the wireless mouse, the keyboard Bluetooth chip controls the key matrix, and controls a communication between the keyboard transceiver chip and the wireless mouse, or a communication between the keyboard transceiver chip and the wireless audio device, and the keyboard transceiver chip transmits a first switching command including the address of the second host ID for switching from the first host to the second host to the wireless mouse and the wireless audio device.

7. The wireless keyboard and mouse combo according to claim 6, wherein the mouse Bluetooth chip controls the two mouse buttons, and controls a communication between the mouse transceiver chip and the wireless keyboard, or a communication between the mouse transceiver chip and the wireless audio device, and the mouse transceiver chip is used to transmit a second switching command including the address of the second host ID for switching from the first host to the second host to the wireless keyboard and the wireless audio device.

8. The wireless keyboard and mouse combo according to claim 7, wherein the audio device Bluetooth chip controls a function of Bluetooth sound effect inside the wireless audio device, and controls a communication between the audio device transceiver chip and the wireless mouse, or a communication between the audio device transceiver chip and the wireless keyboard, and the audio device transceiver chip transmits a third switching command including the address of the second host ID for switching from the first host to the second host to the wireless keyboard and the wireless mouse.

9. The wireless keyboard and mouse combo according to claim 8, wherein the keyboard transceiver chip receives the second and the third switching commands, the mouse transceiver chip receives the first and the third switching commands, and the audio device transceiver chip receives the first and the second switching commands.

10. The wireless keyboard and mouse combo according to claim 6, wherein when the first switching switch, the second switching switch, or the third switching switch is triggered, the wireless keyboard, the wireless mouse and the wireless audio device are all linked and switched from a first host then-connected with the three switching switches to a second host.

11. The wireless keyboard and mouse combo according to claim 6, wherein the sensor is an optical mouse motion sensor, the loudspeaker is a speaker or a headphone driver, after the wireless audio device received the address of the second host ID, the address of the second host ID is checked first to see whether this is a successfully paired host ID; and if yes, then the wireless audio device uses the address of the second host ID to do a third Bluetooth backlink, and if not, then the wireless audio device keeps a third original connection status.

12. The wireless keyboard and mouse combo according to claim 6, wherein the wireless keyboard further includes a first antenna and a second antenna, the wireless mouse further includes a third antenna and a fourth antenna, the wireless audio device further includes a fifth antenna and a sixth antenna, the first antenna is electrically connected to the keyboard Bluetooth chip, the second antenna is electrically connected to the keyboard transceiver chip, the third antenna is electrically connected to the mouse Bluetooth chip, the fourth antenna is electrically connected to the mouse transceiver chip, the fifth antenna is electrically connected to the audio device Bluetooth chip, and the sixth antenna is electrically connected to the audio device transceiver chip.

13. The wireless keyboard and mouse combo according to claim 6, wherein the first host and the second host are any two being selected from a group consisting of a first external host, a second external host and a third external host, the wireless keyboard includes a plurality of keys, and the key matrix includes an 8×18 matrix used to indicate a key of the plurality of keys currently being pressed.

14. The wireless keyboard and mouse combo according to claim 13, wherein each of the first, the second and the third external hosts is one selected from a group consisting of a laptop, a desktop computer and a notebook, and each of the audio device transceiver chip, the keyboard transceiver chip and the mouse transceiver chip is a radio frequency transceiver chip.

15. A wireless keyboard and mouse combo capable of switching both linkedly between controlled devices, comprising:
 a wireless keyboard including:
  a first switching switch; and
  a keyboard Bluetooth/transceiver chip electrically connected to the first switching switch; and
 a wireless mouse including:
  a second switching switch; and
  a mouse Bluetooth/transceiver chip electrically connected to the second switching switch, wherein when the first switching switch or the second switching switch is triggered, an address of a second host ID of a second host is sent from the keyboard Bluetooth/transceiver chip to the wireless mouse or from the mouse Bluetooth/transceiver chip to the wireless keyboard, and the wireless keyboard and the wireless mouse are switched from a first host to the second host.

16. The wireless keyboard and mouse combo according to claim 15, further comprising a wireless audio device, wherein the wireless keyboard further includes a first antenna and a key matrix, the wireless mouse further includes a second antenna, a sensor and two mouse buttons, the wireless audio device includes a third switching switch, a loudspeaker, a microphone, an audio device Bluetooth/transceiver chip and a third antenna, the first antenna and the key matrix are electrically connected to the keyboard Bluetooth/transceiver chip, the second antenna, the sensor and the two mouse buttons are electrically connected to the mouse Bluetooth/transceiver chip, and the third switching switch, the loudspeaker, the microphone and the third antenna are electrically connected to the audio device Bluetooth/transceiver chip.

17. The wireless keyboard and mouse combo according to claim 16, wherein the wireless keyboard includes a plurality of keys, the key matrix includes an 8×18 matrix and is used to indicate a key of the plurality of keys currently being pressed, the sensor is used to sense a movement of the wireless mouse, the keyboard Bluetooth/transceiver chip includes a keyboard Bluetooth chip and a keyboard transceiver chip electrically connected to the keyboard Bluetooth chip, the mouse Bluetooth/transceiver chip includes a mouse Bluetooth chip and a mouse transceiver chip electrically connected to the mouse Bluetooth chip, and the audio device Bluetooth/transceiver chip includes an audio device Bluetooth chip and an audio device transceiver chip electrically connected to the audio device Bluetooth chip.

18. The wireless keyboard and mouse combo according to claim 17, wherein the sensor is an optical mouse motion sensor, the loudspeaker is a speaker or a headphone driver, when the first switching switch is triggered, the keyboard Bluetooth chip sends the address of the second host ID of the second host to the keyboard transceiver chip; the address of the second host ID is sent to the wireless mouse and the wireless audio device from the keyboard transceiver chip; after the wireless mouse or the wireless audio device received the address of the second host ID, the address of the second host ID is checked first to see whether this is a successfully paired host ID; and if yes, then the wireless mouse or the wireless audio device uses the address of the second host ID to do a Bluetooth backlink, and if not, then the wireless mouse keeps a first original connection status and/or the wireless audio device keeps a third original connection status.

19. The wireless keyboard and mouse combo according to claim 18, wherein when the second switching switch is triggered, the mouse Bluetooth chip sends the address of the second host ID of the second host to the mouse transceiver chip; the address of the second host ID is sent to the wireless keyboard and the wireless audio device from the mouse transceiver chip; after the wireless keyboard or the wireless audio device received the address of the second host ID, the address of the second host ID is checked first to see whether this is a successfully paired host ID; and if yes, then the wireless keyboard or the wireless audio device uses the address of the second host ID to do the Bluetooth backlink, and if not, then the wireless keyboard keeps a second original connection status and/or the wireless audio device keeps the third original connection status.

20. The wireless keyboard and mouse combo according to claim 19, wherein when the third switching switch is triggered, the audio device Bluetooth chip sends the address of the second host ID of the second host to the audio device transceiver chip; the address of the second host ID is sent to the wireless keyboard and the wireless mouse from the audio device transceiver chip;

after the wireless keyboard or the wireless mouse received the address of the second host ID, the address of the second host ID is checked first to see whether this is a successfully paired host ID; and if yes, then the wireless keyboard or the wireless mouse uses the address of the second host ID to do the Bluetooth backlink, and if not, then the wireless mouse keeps the first original connection status and/or the wireless keyboard keeps the second original connection status.

* * * * *